United States Patent Office 2,724,948
Patented Nov. 29, 1955

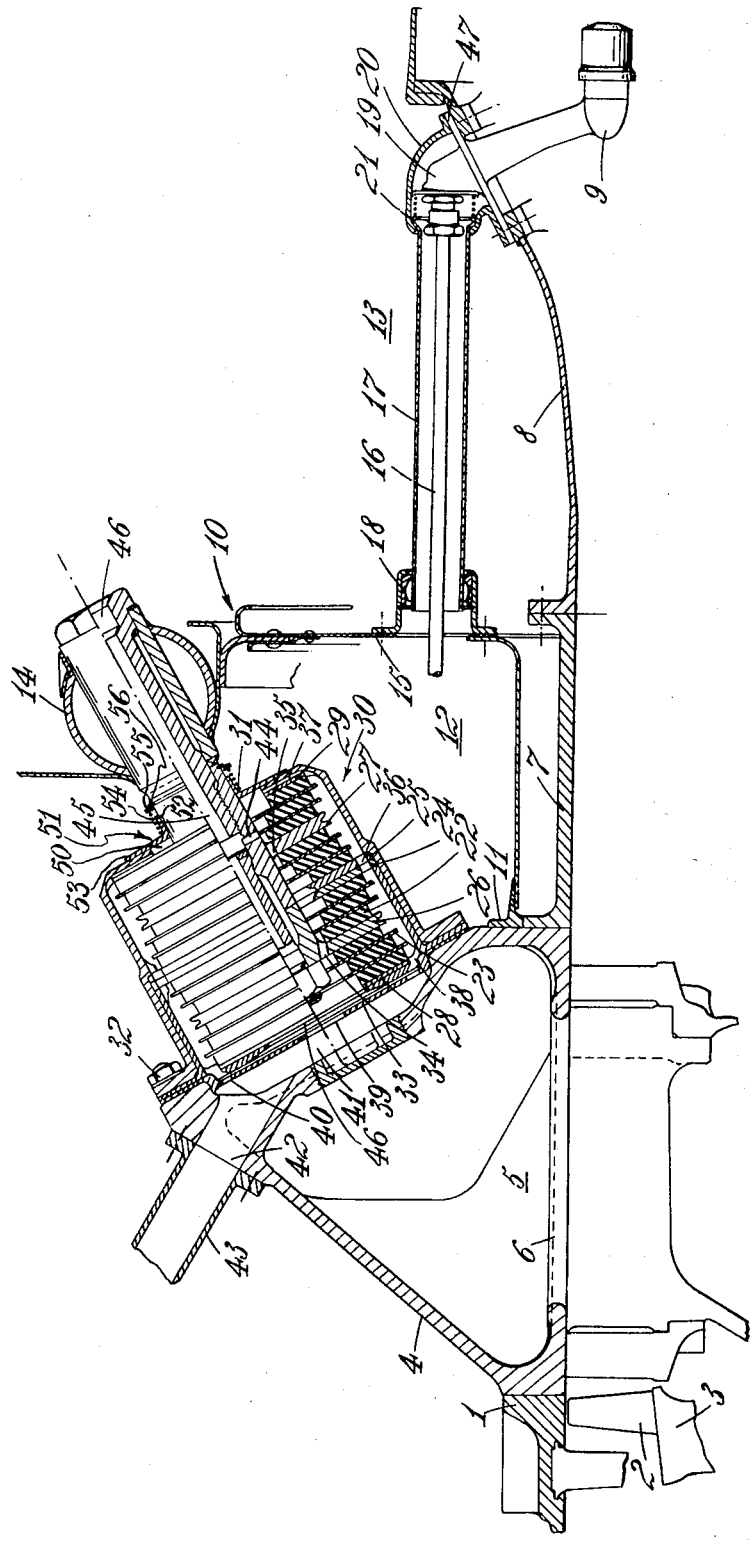

2,724,948

RESILIENT MOUNTING ARRANGEMENTS IN GAS TURBINE ENGINE INSTALLATIONS

George Henry Hiscock and Robert Garbutt, Bristol, England, assignors to The Bristol Aeroplane Company Limited, Bristol, England, a British company Application October 21, 1954, Serial No. 463,687

Claims priority, application Great Britain November 5, 1953

10 Claims. (Cl. 60—39.31)

This invention relates to installations of straight-through axial flow gas turbine engines in aircraft or other vehicles, and concerns such installations of the kind in which the engine is supported by a number of mounting units each comprising resilient means serving to reduce the transmission of noise and vibration from the engine to the supporting structure. The resilient material of these units is usually a natural or synthetic rubber compound and care has to be taken to avoid the working temperature of such material rising beyond a safe limit, whether the rise is due to heat generated in the material itself due to its inherent damping qualities or to heat conveyed from an adjacent source.

In installations of the kind referred to, it is furthermore usual to provide a compartment surrounding the compressor section of the engine and a compartment surrounding the combustion equipment section of the engine, these compartments being separated from one another by a wall structure intended to prevent the spread of fire from one compartment to the other. Both these compartments, and in particular, the second receive much waste heat from the engine and require to be ventilated to remove any fuel or oil vapor and to maintain their temperatures at an acceptable value. Overventilation is, however, detrimental to the efficiency of the plant both on account of the increased air drag thereby produced, and on account of increased heat losses from some parts of the engine; these considerations, and the desirability of arranging the mounting units approximately in the vertical transverse plane through the center of gravity of the engine, which usually falls in a hot region of the engine casing, make it necessary to provide a cooling system for the mounting units.

The object of the invention is to provide an installation arrangement in which these problems are met in a simple and efficient manner.

According to the invention, an installation comprises a straight-through axial flow gas turbine engine having a compressor section and a combustion equipment section, a first compartment surrounding the compressor section of the engine, a second compartment surrounding the combustion equipment section of the engine, said compartments being separated from one another by a fire wall structure intended to prevent the spread of fire from one compartment to the other, a mounting unit for the engine, said mounting unit being located within said first compartment and comprising a first member rigidly attached to the compressor section, a second member rigidly attached to said fire wall structure, and resilient means connecting said first and second members together, a casing isolating the resilient means from the first compartment and means for conveying cooling air in heat exchange relationship with said resilient means and then passing the air to said second compartment to ventilate the same.

According to a feature of the invention, said casing encloses with clearance said resilient means, in which case there is also provided a first conduit for conveying cooling air from a source outside said compartment to said casing, and a second conduit for conveying the cooling air from the casing into said second compartment.

When the feature of the preceding paragraph is adopted said casing may constitute said first member, and in this case, the preferred arrangement, according to the invention, is one in which said mounting unit comprises a stack of disc-annuli of non-metallic resilient material and interposed metal disc-annuli which are bonded together, some of said metal disc-annuli being laterally located relatively to said casing and others being rigidly attached to said second member, which second member preferably comprises a shaft member extending into the casing and through the annuli of the stack to which it is not attached with clearance. With this arrangement, the space within said casing is subdivided into a number of chambers and there is provided a wall port in a wall of said casing, this communicating with said first conduit, a bore extending into said shaft member from an end of said shaft member outside the casing, said bore constituting at least part of said second conduit, ports in the metal disc-annuli attached to said shaft member and ports in the metal disc-annuli laterally located relatively to said casing whereby all said chambers are placed in communication with said wall port and said bore.

An installation in an aircraft, which installation is in accordance with the present invention, will be described with reference to the accompanying drawing which shows only those parts of the engine and fire wall structure between the first and second compartments which are adjacent one of the mounting units, there being in the complete installation four such mounting units equally spaced around the engine.

In the drawing, 1 is the high pressure end of the compressor stator casing of a straight-through axial-flow gas turbine engine, 2 being the last row of moving blades carried by the rotor 3. Bolted to the casing 1 is a compressor delivery casing 4 incorporating a peripheral gallery 5 into which air is bled off from the compressor through slots 6 for use for cabin pressurization and de-icing purposes. A further intermediate casing 7 connects the casing 4 to the combustion equipment section 8 of the engine, one of the several fuel injection burners being indicated at 9.

The engine is housed in a nacelle or wing compartment comprising a fire wall structure generally indicated at 10 which is attached to the engine by a flange 11 so as to divide the nacelle into a first compartment 12 and a second compartment 13 surrounding respectively the compressor section of the engine and the combustion equipment section of the engine. The fire wall structure 10 comprises a main structural member 14 of sufficient strength to support the engine, while the portion 15 of the fire wall between the member 14 and the attachment flange 11 is made sufficiently flexible to allow relative movement between the engine and the main structural member 14. At 16 is shown a fuel supply pipe lying within the compartment 12 and passing to a connection with a burner strut 19, the connection being located on the engine casing of the section 8 of the engine. The part of the pipe 16 which traverses the compartment 13 is enclosed in a larger diameter pipe 17 which constitutes an extension of the fire wall structure 10 and is connected into the fire wall structure at one end by an airtight sliding and universal joint 18 and at its other end to the burner strut 19 by a hood 20 and universal joint 21 making an airtight joint at the flange 47 of the strut.

The engine is supported from the main structural member 14 by four equally spaced mounting units of which one is shown in the drawing. Each mounting unit comprises twelve disc-annuli 22 of non-metallic resilient material bonded to interposed metal disc-annuli of which some, as indicated at 23, are of thin gauge material while others as shown at 24, 25, 26, 27, 28 and 29 are of thick material. Of the thick metal disc-annuli, 24 and 25 are intermediately positioned side by side and are not bonded together, so that the assembly comprises two identical bonded stacks of disc-annuli. The disc-annuli 24, 25 seat in a recess formed between two halves of a casing indicated generally by the reference 30, which surrounds the remaining disc-annuli with clearance and isolates the disc-annuli from the compartment 12. The disc-annuli 24, 25 seat in a recess formed between the casing halves right around their outer periphery and are thereby located against lateral movement relatively to the casing 30. The end metal disc-annuli 28 and 29 similarly seat in recesses in the ends of the two halves of the casing 30 and are laterally located with respect to the casing. The casing 30 constitutes the first member of the mounting unit, and is rigidly attached by bolts 32 to the compressor delivery casing 4 with the interposition of a heat barrier member 33 of compressed fiber or other poor heat conducting material.

The other thick metal annuli 26 and 27, which are positioned centrally in the two stacks are attached right around their inner peripheries to two parts of a shaft member indicated generally by the reference 31. The shaft member 31 constitutes the second member of the mounting unit and extends into the casing 30 with clearance through an opening 50 in the outer end of the casing and through the disc-annuli 22 and 23 to which it is not attached, also with clearance. The shaft member 31 is rigidly attached to the main structural member 14 and carries a cover generally indicated at 51 which closes the opening 50 in a pressure tight manner.

The cover 51 comprises a sleeve 52 slidably mounted on the shaft member 31, the sleeve having an outwardly directed flange 53 which closes the opening 50, the flange being spring-pressed into engagement with a seating on the casing 30 around the opening 50 by means of a spring 54 engaged between the flange 53 and a collar 55 on the shaft member 31, the collar abutting a spring clip 56 sprung into a groove in the shaft member 31. The cover 51 as described provides an adequate closure or air seal for the opening 50 while allowing relative displacement axially and laterally between the shaft member 31 and the casing.

With the arrangement so far described the engine is supported from the member 14 with the interposition of the disc-annuli 22 of resilient material. The thick metal annuli 24, 25, 26 and 27 divide the interior of the casing 30 into five chambers, two around the outside of the disc-annuli and three within the disc-annuli. To allow cooling air to pass between the chambers on the inside and outside of the disc-annuli respectively, these chambers are placed in communication with one another by ports 34, 35 and 36 formed in the disc-annuli 24, 25, 26 and 27. Cooling air is fed through the chambers as will now be described.

The heat barrier member 33 covers a dish-like recess in the delivery casing 4 which recess is provided with a port 42 to which is connected a first conduit or pipe 43 conveying cooling air from a forwardly facing air intake opening which may be the air intake of the engine (not shown).

The heat barrier member is provided with ports 40 which connect, through ports 38, in the end wall of the casing, the interior of the casing 30 around the outside of the disc-annuli to the recess 41, and with a port 39 which connects through a central opening or port 46 in the end wall of the casing the interior of the casing inside the disc-annuli with the recess 41. The cooling air passes from the pipe 43 into the recess 41 and then in heat exchange relation around the disc-annuli of resilient material 22, and is finally discharged from the casing 30 through ports 44 in the shaft 31 into a second conduit in the form of a central bore 45 in the shaft 31, which bore opens at 46 into the compartment 13 surrounding the combustion equipment of the engine, the air entering port 39 flowing inside the disc-annuli and passing through ports 34 and 35 and between the disc-annuli 22 and 23 and the shaft member 31 to reach the ports 44 and the air entering ports 40 flowing outside the disc-annuli and passing thhrough ports 36 and grooves 37 to reach the ports 44. An outlet for air entering compartment 13 through bore 45 is provided at the rear end of the compartment 13 at any convenient position so that the cooling air flowing through the mounting units also ventilates the compartment 13. Separate ventilation means (not shown) are provided for the compartment 12 surrounding the compressor section of the engine.

With the installation described, the compartment 13 is sealed in an airtight manner from the compartment 12 and any leakage of fuel from the pipe 16 is prevented because of the airtight joints 18 and 21, from entering the compartment 13 which has a comparatively high working temperature owing to heat radiated from the casings of the combustion equipment.

Furthermore, leakage of fuel entering compartment 12 is prevented from passing in vaporized form with the ventilating air into the compartment 13 because the cooling air flow path through pipe 43, casing 30 and bore 45 is isolated from the compartment 12.

The installation described meets the problems of effectively cooling the engine mounting units and efficiently ventilating the compartment surrounding the combustion equipment section of the engine in a simple and efficient manner.

We claim:

1. In a vehicle, an installation comprising a straight-through axial-flow gas turbine engine having a compressor section and a combustion equipment section, a first compartment surrounding the compressor section of the engine, a second compartment surrounding the combustion equipment section of the engine, said compartments being separated from one another by a fire wall structure intended to prevent the spread of fire from one compartment to the other, a mounting unit for the engine, said mounting unit being located within said first compartment and comprising a first member rigidly attached to the compressor section, a second member rigidly attached to said fire wall structure, and resilient means connecting said first and second members together, a casing isolating the resilient means from the first compartment and means for conveying cooling air in heat exchange relationship with said resilient means and then passing the air to said second compartment to ventilate the same.

2. An installation as claimed in claim 1 wherein said casing encloses with clearance said resilient means, wherein a first conduit is provided for conveying cooling air from a source outside said compartments to said casing, and wherein a second conduit is provided for conveying the cooling air from the casing into said second compartment.

3. An installation as claimed in claim 2, wherein said casing constitutes said first member.

4. An installation as claimed in claim 3, wherein said mounting unit comprises a stack of disc-annuli of nonmetallic resilient material and interposed metal disc-annuli which are bonded together, some of said metal disc-annuli being laterally located relatively to said casing and others being rigidly attached to said second member, which second member comprises a shaft member extending into the casing and through the disc-annuli of the stack, the shaft member extending with clearance through each of the disc-annuli to which it is not attached, the space within said casing being thus subdivided into a number of chambers, and wherein there is provided a wall port in a wall of said casing, said wall port communicating with said first conduit, a bore extending into said shaft member from an end of said shaft member outside said casing, said bore constituting at least part of said second conduit, ports in the metal disc-annuli laterally located relatively to said casing and ports in the metal disc-annuli attached to said shaft member whereby all said chambers are placed in communication with the said wall port and said bore.

5. An installation as claimed in claim 3, wherein said casing is attached to said compressor section with the interposition of a heat barrier member of heat insulating material.

6. An installation as claimed in claim 5, wherein the wall of said compressor section has a dish-like recess which is covered by said heat barrier member and an end wall of said casing, wherein said first conduit opens into said recess, and wherein said wall port is in said end wall of the casing and communicates with said recess through a corresponding port in the heat barrier member.

7. An installation as claimed in claim 4, wherein the stack of disc-annuli is in two parts each comprising end disc-annuli of metal seating in recesses in said casing, and wherein a metal disc-annulus intermediately positioned in each said stack is attached to said shaft member right round its inner periphery.

8. An installation as claimed in claim 7, wherein end disc annuli of said stacks abut one another and are located against lateral movement relatively to the casing in a circumferential recess formed between two parts of said casing.

9. An installation as claimed in claim 1, wherein said fire wall structure comprises a main structural member of sufficient strength to support the engine, to which structural member said second member is attached, and a flexible wall portion extending between the main structural member and the engine casing between said compressor section and said combustion equipment section.

10. An installation as claimed in claim 9, wherein a fuel supply pipe lies within said first compartment and passes to a connection on the engine casing of the combustion equipment section of the engine, part of said pipe thus transversing said second compartment, and wherein said fire wall structure further comprises a pipe of larger diameter than the fuel pipe, which larger diameter pipe encloses that portion of said fuel pipe which transverses said second compartment and is connected at one end into the fire wall structure by an airtight sliding and universal joint, and at its other end to said connection by an airtight universal joint.

References Cited in the file of this patent

UNITED STATES PATENTS

| | | |
|---|---|---|
| 2,630,105 | Hasbrouck et al. | Mar. 3, 1953 |
| 2,648,509 | Henshaw | Aug. 11, 1953 |